(12) United States Patent
Sacripante et al.

(10) Patent No.: US 7,851,549 B2
(45) Date of Patent: Dec. 14, 2010

(54) CURABLE POLYESTER LATEX MADE BY PHASE INVERSION EMULSIFICATION

(75) Inventors: Guerino G. Sacripante, Oakville (CA); George Liebermann, Mississauga (CA); Nathan Belliveau, Weymouth (CA); Shigang S. Qiu, Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 572 days.

(21) Appl. No.: 11/956,035

(22) Filed: Dec. 13, 2007

(65) Prior Publication Data

US 2009/0155712 A1 Jun. 18, 2009

(51) Int. Cl.
- C08L 67/00 (2006.01)
- C08L 67/02 (2006.01)
- C08G 69/48 (2006.01)

(52) U.S. Cl. .................. 524/601; 524/604; 524/605; 524/608; 523/500

(58) Field of Classification Search .......... 523/500; 524/539, 601, 604, 605, 608; 106/31.25; 430/137.14, 137.15; 528/272, 302, 308, 528/308.6

See application file for complete search history.

(56) References Cited

U.S. PATENT DOCUMENTS

| | | | |
|---|---|---|---|
| 5,212,526 A | 5/1993 | Domoto et al. | |
| 5,449,719 A | 9/1995 | Sacripante et al. | |
| 5,869,567 A * | 2/1999 | Fujita et al. | 524/608 |
| 6,063,827 A | 5/2000 | Sacripante et al. | |
| 6,608,987 B2 | 8/2003 | Bartscher et al. | |
| 6,653,041 B2 | 11/2003 | Payne et al. | |
| 6,665,516 B2 | 12/2003 | Morgenweck et al. | |
| 6,710,092 B2 | 3/2004 | Scher et al. | |
| 6,713,222 B2 | 3/2004 | Sacripante et al. | |
| 6,837,839 B2 | 1/2005 | Payne et al. | |
| 6,880,463 B2 | 4/2005 | De Meulemeester et al. | |
| 7,208,257 B2 | 4/2007 | Cheng et al. | |
| 7,250,238 B2 | 7/2007 | Fromm et al. | |
| 2007/0059630 A1 * | 3/2007 | Chen et al. | 430/137.14 |
| 2007/0088117 A1 * | 4/2007 | Zhou et al. | 524/539 |
| 2008/0199797 A1 * | 8/2008 | Sacripante et al. | 430/104 |
| 2008/0236446 A1 * | 10/2008 | Zhou et al. | 106/31.25 |
| 2009/0035686 A1 * | 2/2009 | Sacripante | 430/110.2 |

OTHER PUBLICATIONS

U.S. Appl. No. 11/676,080, filed Feb. 16, 2007, Sacripante et al.

* cited by examiner

*Primary Examiner*—Milton I Cano
*Assistant Examiner*—Hannah Pak
(74) *Attorney, Agent, or Firm*—Oliff & Berridge, PLC

(57) ABSTRACT

A process for preparing a curable polyester based emulsion is provided in embodiments, containing one or more unsaturated polyesters and one or more photoinitiators obtained by a phase inversion process, in which the particle size and particle size distribution is controlled by process parameters, such as solvent, solvent ratio, neutralization ratio of the resin and temperature.

20 Claims, No Drawings

CURABLE POLYESTER LATEX MADE BY PHASE INVERSION EMULSIFICATION

BACKGROUND

There is a need for robust toner images as well as clear curable toner overcoats, especially towards heat, chemical and mechanical resistance. Curable toner compositions comprised of an unsaturated polyester resin and UV photoinitiator, result in robust image properties after fusing with a fixture comprised of UV Lamps. However, such toners have been prepared via the Emulsion Aggregation ("EA") process utilizing emulsions prepared by a solvent flash process. This process is generally uneconomical, because it utilizes a 10 to 1 ratio of solvent to resin and has low overall batch yields (<15% solids). There is a need for a more economical process for the preparation of emulsions comprised of unsaturated resin(s) and photoinitiator(s).

This disclosure is a process for the preparation of curable unsaturated polyester emulsions via the Phase Inversion technique. The properties of the curable unsaturated polyester emulsion, in particular particle size and particle size distribution, can be controlled by several process parameters, such as solvents and solvent ratio, neutralization ratio of the resin, and others. By controlling such process parameters, nanoscale and near-nanoscale particles can be obtained.

The Phase Inversion Emulsification (PIE) process is the procedure whereby the phases of a liquid-liquid dispersion interchange such that the dispersed phase spontaneously inverts to become the continuous phase and vice versa under conditions determined by the system properties, volume ratio and energy input.

The phase inversion process involves the solubilization of resin and other components in an organic solvent, which is immiscible with water. A phase inversion organic solvent is also added, which is typically chosen such that it is soluble with both the organic and aqueous phase. This phase is known in the art as the oil, or organic phase.

REFERENCES

In U.S. Pat. No. 5,212,526, there is illustrated a process and apparatus for transferring and fusing an image to a recording medium, and wherein in an imaging process, a toned image layer on an image receptor is simultaneously transferred and fused to a recording medium. A radiation curable material is incorporated in the toned image layer such that when the toned image layer is irradiated, the radiation curable material is cured. The resulting cured material has greater adhesion to the toner material and the recording medium than to the surface of the image receptor. The apparatus for performing the above process is also disclosed.

Similarly in U.S. Pat. No. 6,713,225, there is illustrated a process for crosslinking an image comprising applying ultraviolet light to an image comprised of a toner containing an unsaturated resin, photo initiator and colorant. Although, both of the aforementioned '526 and '222 patent, illustrates the curing of toner by Ultra-Violet light, the curing is done at elevated temperatures such as from about 160 to 185° C., additionally the toners are prepared by conventional melt extrusion, grinding and classification process.

Similarly, in U.S. Pat. No. 6,608,987, there is disclosed a method for printing and/or coating of a substrate, especially paper or cardboard, using at least one curable coating, comprising: at least one toner layer or an image having at least one toner layer is transferred to the substrate and fixed on it, the toner being a UV curable toner having at least one polymer that is exposed to UV (ultraviolet) radiation for crosslinking of its polymer chain, the degree of melting of the toner layer being fixed being controlled as a function of the desired luster. Other relevant prior art that describes similar toners composition which is cured when exposed to ultraviolet light are depicted in U.S. Pat. Nos. 6,665,516, 6,880,463, 6,837,839, and 6,653,041.

Copending U.S. application Ser. No. 11/676,080, teaches curable toner compositions, such as made by a chemical process such as emulsion aggregation, wherein the resultant toner composition comprises an unsaturated polyester resin, a photo initiator, optionally a wax, and optionally a colorant. This process generally comprises aggregating latex particles, such as latexes containing an unsaturated resin such as an unsaturated polyester resin, a photo initiator, optionally a wax, and optionally a colorant, in the presence of a coagulant. This disclosure is also directed to development processes using such a toner, where the formed image is cured by ultraviolet light, with a conventional heated radiant or pressure fusing.

Copending U.S. application Ser. No. 11/248,277 teaches the preparation of emulsions comprising epoxy resin, sulfonated polyester resin and a nonionic surfactant by a Phase Inversion Emulsification process. The present disclosure is directed to a curable polyester latex made by phase inversion emulsification wherein the toner does not require an epoxy resin, but an unsaturated polyester resin.

The Phase Inversion Emulsification process is known and can be used, for example, to generate a crystalline nanoparticle. Of particular interest is copending U.S. application Ser. No. 11/830,351, which teaches the preparation of amorphous polyester resin nanoparticles comprised of poly(propoxylated bisphenol co-fumarate) by the phase inversion process.

U.S. Pat. No. 7,250,238, teaches Emulsion Aggregation toners that are curable upon exposure to ultraviolet light and teaches suitable photoinitiators.

U.S. Pat. No. 6,063,827 teaches unsaturated polyester resins.

Further, in U.S. Pat. No. 5,449,719, there is illustrated a two-step process for the preparation of unsaturated polyester resin, and which comprises the first reaction of a phthalate resin and a glycol to provide a transesterified product, and subsequently a second reaction comprising reacting the product with an unsaturated dicarboxylate monomer.

The present disclosure also relates to a method for applying the ink to form an image. In embodiments, the method comprises providing the ink at or above the first temperature; applying the ink to a substrate to form an image, the substrate being at or below the second temperature. Where the ink is radiation curable, the method preferably further comprises exposing the ink to radiation to cure the ink. In a preferred embodiment, the composition is applied over the image by ink jet printing.

The disclosures of each of the foregoing patents and publications are hereby incorporated by reference herein in their entireties. The appropriate components and process aspects of the each of the foregoing patents and publications may also be selected for the present compositions and processes in embodiments thereof.

SUMMARY

A process for preparing a curable polyester based emulsion is provided in embodiments, containing one or more unsaturated polyesters and one or more photoinitiators obtained by a phase inversion process, in which the particle size and particle size distribution is controlled by process parameters, such as solvent, solvent ratio, neutralization ratio of the resin and temperature.

EMBODIMENTS

According to the present disclosure, a set of transfer functions has been devised that enables the accurate prediction of desired emulsion particle size within a defined variability, based on such factors as solvent, solvent ratio, neutralization ratio of the resin, temperature, and the like. By controlling such process parameters, nanoscale and near-nanoscale particles can be accurately and easily obtained having the desired particle size and defined variability, without having to painstakingly conduct multiple experiments adjusting a myriad of process parameters.

In embodiments, the transfer functions obtained can be generically stated as:

$$Y=575-[(447.4)(SR)]-[(163.75)(NR)]+[(0.3285)(T)(SR)]; \text{ and} \quad (1)$$

$$S=789-[(2.87)(T)]+[(256.9)(SR)]-[(586.4)(NR)]+[(2.27)(T)(NR)]-[(250.8)(SR)(NR)]; \quad (2)$$

wherein Y is the particle size of the emulsion (in nanometers), S is the variability in emulsion size for the same set of conditions (in nanometers), SR is the solvent to resin ratio, NR is the neutralization (base to resin) ratio, and T is the temperature in degrees Kelvin (defined as degrees centigrade plus 273).

Because other process parameters besides the solvent to resin ratio, neutralization ratio, and temperature can affect the particle size Y and the variability in emulsion size S, it is understood that these functions may not be exact, but are more properly stated as approximations. Thus, for example, in embodiments the transfer functions can more generically be stated as:

$$Y=Z_1 \cdot \{575-[(447.4)(SR)]-[(163.75)(NR)]+[(0.3285)(T)(SR)]\}; \text{ and} \quad (1)$$

$$S=Z_2 \cdot \{789-[(2.87)(T)]+[(256.9)(SR)]-[(586.4)(NR)]+[(2.27)(T)(NR)]-[(250.8)(SR)(NR)]\} \quad (2)$$

where $Z_1$ and $Z_2$ represent error factors of, for example, about 0.8 to about 1.2 or about 0.9 to about 1.1, or about 0.95 to about 1.05. These error factors thus take into account that while the transfer functions provide predictability to the desired emulsion particle size within a defined variability, exact mathematical certainty can be effected to a small extent by other process variables.

Utilizing this transfer function, one can obtain any desired particle size within a defined variability. For example, if one wants to generate an emulsion particle size of 190 nm+/−10 nm, or a mean size of 190 nm with a lower and higher specification limits of 180 and 200 nm with a confidence of 99% that such a particle size is achieved, then the transfer function can generate various conditions to obtain the desired particle size.

For instance, in order to provide a particle size of 190 nm and minimize variability, one would set the Temperature at 50.9 degrees centigrade (328 degrees K), the solvent (such as methyl ethyl ketone) ratio to be 0.618 and the neutralization ratio to be 1.10. As a result, with 99% confidence, the transfer function would predict the particle size (Y) and variability (S) to be:

$$Y=184.97 \text{ nm}=575-[(447.4)(0.617)]-[(163.75)(1.10)]+[(0.3285)(328)(0.618)];$$

and $$S=9.386 \text{ nm}=789-[(2.87)(328)]+[(256.9)(0.618)]-[(586.4)(1.10)]+[(2.27)(328)(1.10)]-[(250.8)(0.618)(1.10)].$$

Accounting for the error factors $Z_1$ and $Z_2$, where each of $Z_1$ and $Z_2$ may be taken to be about 0.9 to about 1.1, then the range of values for Y and S would be: Y=166.47 to 203.47 nm; and S 8.45 to $10.3)_2$ nm.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

Utilizing this transfer function, one can obtain any desired particle size within a defined variability via the phase inversion process. The phase inversion process disclosed herein for preparation of a curable polyester based emulsion, comprises dissolving a resin and other optional components into a solution of an organic solvent and a phase inversion solvent to form a mixture; adding a neutralization agent; adding water; and removing the organic solvent.

The phase inversion process disclosed herein involves the solubilization of resin and other components, such as a photoinitiator, in an organic solvent that is immiscible with water, for example, methyl ethyl ketone or ethyl acetate, and a phase inversion organic solvent, such as isopropanol; adding a neutralization agent, such as ammonium hydroxide; adding water; and removing the organic solvent by, for example, distillation.

The phase inversion process disclosed herein first involves the solubilization of resin and other components in an organic solvent, which is generally immiscible with water. The ratio of resin to solvent is usually determined by solubility and resulting viscosity. It has been found that the optimal ratio of the phase inversion process disclosed herein is approximately 5 to 7 parts of organic solvent, for example, methyl ethyl ketone, per 10 parts of resin.

Of course, other suitable ratios of solvent to resin can be used, in embodiments, as desired. Thus, for example, the ratio of solvent to resin can be suitably selected to be from about 20:1 or about 15:1 to about 1:1 or about 2:1, such as about 10:1 to about 3:1. Ratios outside of these ranges can also be used.

Additional examples of organic solvents, which can be used in the disclosure and are immiscible with mater include aromatic hydrocarbons, for example, toluene, benzene, xylene, mesitylene, and chlorobenzene; aliphatic hydrocarbon solvents, for example, pentane, hexane, heptane, octane, and cyclohexane; ester solvents, for example, ether, methyl ethyl acetate, ethyl acetate, and methyl t-butyl ether (MTBE); ketone solvents, for example, methyl isobutyl ketone and methyl ethyl ketone; halogenated aliphatic hydrocarbon solvents, for example, dichloromethane, dichloroethane, and carbon tetrachloride; halogenated saturated hydrocarbons, for example, methylene chloride; and mixtures thereof.

The phase inversion process disclosed herein next involves adding a phase inversion organic solvent to the resin/solvent mixture. The phase inversion organic solvent is typically chosen such that it is soluble with both the organic and aqueous phase. This is known in the art as the oil, or organic phase. An example of a phase inversion organic solvent is isopropanol. It has been found that the optimal ratio of the phase inversion organic solvent disclosed herein is approximately 1 to 3 parts of phase inversion solvent, such as isopropanol, per 10 parts of resin.

Of course, other suitable ratios of phase inversion organic solvent to resin can be used, in embodiments, as desired. Thus, for example, the ratio of phase inversion organic solvent to resin can be suitably selected to be from about 10:1 or about 5:1 to about 1:5 or about 1:3, such as about 4:1 to about 1:2. Ratios outside of these ranges can also be used.

Further examples of suitable phase inversion organic solvents include acetic acid, acetone, acetonitrile, diethylene glycol, diglyme, dimethoxy-ethane (glyme), dimethyl-sulfoxide (DMSO), dimethyl-formamide (DMF), dioxane, ethanol, ethylene glycol, glycerin, methanol, propan-1-ol, t-butyl alcohol, and mixtures thereof.

Although it is described here that the resin is first solubilized in an organic solvent, followed by addition of the phase inversion organic solvent, it is understood that this order of steps is not essential. Thus, for example, in embodiments a single step can be performed whereby the resin and other optional components are solubilized in the organic solvent at the same time that the phase inversion organic solvent is added, or the resin can be solubilized in an already prepared mixture of the organic solvent and phase inversion organic solvent.

The phase inversion process disclosed herein further involves a neutralization agent, or base chemical with a pH of from about 8 to about 14, such as ammonium hydroxide. Additional neutralization agents include, for example, ammonium chloride, and alkali metal hydroxides, such as NaOH. KOH and LiOH.

Although not limited by any theory, it is believed that the addition of a neutralization agent is responsible for ionizing the acid functionality of the polyester resin through its carboxylic acid residue. Typically, a ratio of 50 to 150% of neutralizing, agent is proportional to the percentage of acid groups available on the polyester resin.

The amount of neutralization ratio was calculated using an equimolar amount to the acid value of the resin. Thus, neutralization ratio is defined as the amount of base required neutralize the resin acidic groups. A neutralization ratio of 1.0 implies that every acidic moiety in the resin is neutralized by a base (hydroxide ion).

The phase inversion process disclosed herein next involves adding water to the mixture. Water is generally added dropwise. Although not limited by any theory, this results in the phase inversion of the oil phase in the aqueous phase such that submicron oil droplets are formed.

The phase inversion process disclosed herein next involves removing the organic solvent, by, for example, distillation. Additional removal techniques include extraction.

The phase inversion process disclosed herein can be used to solubilize resin or a combination of resin and other components. Examples of other components that can be included in the emulsion are, for example, photoinitiators, colorants, waxes, coagulants and the like. For example, where the resin emulsion is to be used in forming electrostatographic toner particles, the resin emulsion can include some or all of these additional components, and/or the resin emulsion can be combined with one or more additional emulsions or additives to provide the final toner product.

It has been found that the optimal ratio of the phase inversion process disclosed herein is approximately 10 parts of resin (including photoinitiator), 5 to 7 parts of organic solvent, preferably methyl ethyl ketone, and 1 to 3 parts of phase inversion solvent, preferably isopropanol.

The specific resin, polymer or polymers selected for the emulsion of the present disclosure include unsaturated polyester and/or its derivatives, including polyester resins and branched polyester resins, polyimide resins, branched polyimide resins, poly(styrene-acrylate) resins, crosslinked poly (styrene-acrylate) resins, poly(styrene-methacrylate) resins, crosslinked poly(styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated poly(styrene-acrylate) resins, poly(styrene-methacrylate) resins, cross linked alkali sulfonated-poly(styrene-methacrylate) resins, alkali sulfonated-poly(styrene-butadiene) resins, crosslinked alkali sulfonated poly(styrene-butadiene) resins, and crystalline polyester resins.

Illustrative examples of polymer resins selected for the process and particles of the present disclosure include any of the various polyesters, such as crystalline polyesters, amorphous polyesters, or a mixture thereof. Thus, for example, the particles can be comprised of crystalline polyester resins, amorphous polyester resins, or a mixture of two or more polyester resins where one or more polyester is crystalline and one or more polyester is amorphous.

Illustrative examples of crystalline polymer resins selected for the process and particles of the present disclosure include any of the various crystalline polyesters, such as poly(ethylene-adipate), poly(propylene-adipate), poly(butylene-adipate), poly(pentylene-adipate), poly(hexylene-adipate), poly (octylene-adipate), poly(ethylene-succinate), poly (propylene-succinate), poly(butylene-succinate), poly (pentylene-succinate), poly(hexylene-succinate), poly (octylene-succinate), poly(ethylene-sebacate), poly (propylene-sebacate), poly(butylene-sebacate), poly (pentylene-sebacate), poly(hexylene-sebacate), poly (octylene-sebacate), copoly(5-sulfoisophthaloyl)-copoly (ethylene-adipate), copoly(5-sulfoisophthaloyl)-copoly (propylene-adipate), copoly(5-sulfoisophthaloyl)-copoly (butylene-adipate), copoly(5-sulfo-isophthaloyl)-copoly (pentylene-adipate), copoly(5-sulfo-isophthaloyl)-copoly (hexylene-adipate), copoly(5-sulfo-isophthaloyl)-copoly (octylene-adipate), copoly(5-sulfo-isophthaloyl)-copoly (ethylene-adipate), copoly(5-sulfo-isophthaloyl)-copoly (propylene-adipate), copoly(5-sulfo-isophthaloyl)-copoly (butylene-adipate), copoly(5-sulfo-isophthaloyl)-copoly (pentylene-adipate), copoly(5-sulfo-isophthaloyl)-copoly (hexylene-adipate), copoly(5-sulfo-isophthaloyl)-copoly (octylene-adipate), copoly(5-sulfoisophthaloyl)-copoly (ethylene-succinate), copoly(5-sulfoisophthaloyl)-copoly (propylene-succinate), copoly(5-sulfoisophthaloyl)-copoly (butylene-succinate), copoly(5-sulfoisophthaloyl)-copoly (pentylene-succinate), copoly(5-sulfoisophthaloyl)-copoly (hexylene-succinate), copoly(5-sulfoisophthaloyl)-copoly (octylene-succinate), copoly(5-sulfo-isophthaloyl)-copoly (ethylene-sebacate), copoly(5-sulfo-isophthaloyl)-copoly (propylene-sebacate), copoly(5-sulfo-isophthaloyl)-copoly (butylenes-sebacate), copoly(5-sulfo-isophthaloyl)-copoly (pentylene-sebacate), copoly(5-sulfo-isophthaloyl)-copoly (hexylene-sebacate), copoly(5-sulfo-isophthaloyl)-copoly (octylene-sebacate), copoly(5-sulfoisophthaloyl)-copoly (ethylene-adipate), copoly(5-sulfo-isophthaloyl)-copoly (propylene-adipate), copoly(5-sulfo-isophthaloyl)-copoly (butylene-adipate), copoly(5-sulfo-isophthaloyl)-copoly (pentylene-adipate), copoly(5-sulfo-isophthaloyl)-copoly (hexylene-adipate), poly(octylene-adipate) and unsaturated copolyesters such as copoly(ethylene-sebacate)-copoly(ethylene-fumarate), copoly(ethylene-dodecanoate)-copoly(ethylene-fumarate), copoly(nonylene-sebacate)-copoly(nonylene-fumarate), copoly(nonylene-dodecanoate)-copoly (nonylene-fumarate), copoly(decylene-sebacate)-copoly (decylene-fumarate), or copoly(decylene-dodecanoate)-copoly(decylene-fumarate), copoly(butylene-fumarate)-copoly(hexylene-fumarate) and the like.

The crystalline resins, which are available from a number of sources, can possess various melting points of, for example, from about 30° C. to about 120° C., such as from about 50° C. to about 90° C. The crystalline resin may have, for example, a number average molecular weight (Mn), as measured by gel permeation chromatography (GPC) of, for example, from about 1,000 to about 50,000, and preferably from about 2,000 to about 25,000. The weight average molecular weight (Mw) of the resin may be, for example, from about 2,000 to about 100,000, and preferably from about 3,000 to about 80,000, as determined by GPC using polystyrene standards. The molecular weight distribution (Mw/Mn) of the crystalline resin is, for example, from about 2 to about 6, and more specifically, from about 2 to about 4.

The crystalline resins can be prepared by a polycondensation process by reacting suitable organic diol(s) and suitable organic diacid(s) in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and can be selected in an amount, for example, of from about 0.01 to about 1 mole percent of the resin. Additionally, in place of the organic diacid, an organic diester can also be selected, and where an alcohol byproduct is generated.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include fumaric, maleic, oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1, 8-naphthalic anhydride, 4-sulfo-phthalic acid, dimethyl-4-sulfo-phthalate, dialkyl-4-sulfo-phthalate, 4-sulfophenyl-3, 5-dicarbomethoxybenzene, 6-sulfo-2-naphthyl-3,5-dicarbometh-oxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methyl-pentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

Illustrative examples of amorphous unsaturated polymer resins selected for the process and particles of the present disclosure include any of the various amorphous polyesters, such as SPAR™ (Dixie Chemicals), BECKOSOL™ (Reichhold Inc), ARAKOTE™ (Ciba-Geigy Corporation). HETRON™ (Ashland Chemical), PARIAPLEX™ (Rohm & Hass), POLYLITE™ (Reichhold Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation) mixtures thereof and the like. The resins can also be functionalized, such as carboxylated, sulfonated, or the like, and particularly such as sodio sulfonated, if desired.

The amorphous resins, linear or branched, which are available from a number of sources, can possess various onset Tg's of, for example, from about 40° C. to about 80° C., such as from about 50° C. to about 70° C. as measured by differential scanning calorimetry (DSC). The linear and branched amorphous polyester resins, in embodiments, possess, for example, a number average molecular weight (Mn), as measured by GPC, of from about 10,000 to about 500,000, such as from about 5,000 to about 250,000; a weight average molecular weight (Mw) of, for example, from about 20,000 to about 600,000, such as from about 7,000 to about 300,000, as determined by GPC using polystyrene standards; and a molecular weight distribution (Mw/Mn) of, for example, from about 1.5 to about 6, such as from about 2 to about 4.

The linear amorphous polyester resins are generally prepared by the polycondensation of an organic diol, a diacid or diester, and a polycondensation catalyst. For the branched amorphous sulfonated polyester resin, the same materials may be used, with the further inclusion of a branching agent such as a multivalent polyacid or polyol. The amorphous resin is generally present in the composition in various suitable amounts, such as from about 60 to about 90 weight percent, or from about 50 to about 65 weight percent, of the solids.

Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethyl succinate, dimethylfumarate, dimethylmaleate, dimethylglutarate, dimethyl adipate, di methyl dodecylsuccinate, and mixtures thereof. The organic diacid or diester is selected, for example, from about 45 to about 52 mole percent of the resin. Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and mixtures thereof. The amount of organic diol selected can vary, and more specifically, is, for example, from about 45 to about 52 mole percent of the resin.

Branching agents for use in forming the branched amorphous sulfonated polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitan, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Examples of suitable polycondensation catalyst for either the crystalline or amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of for ex ample, from about 0.01 mole percent to about 5 mole percent based on the starting diacid or diester used to generate the polyester resin.

Further examples of unsaturated polyester resins are poly(propoxylated bisphenol-A co-fumarate), poly(ethoxylated bisphenol-A co-fumarate), poly(butyloxylated bisphenol co-fumarate), poly(co-propoxylated bisphenol co ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), and poly(1,2-propylene itaconate).

Examples of UV-photoinitiators are 2-hydroxy-2-methyl-1-phenyl-1-propanone available from Ciba-Geigy under the grade designation Darocur 1173; 1-hydroxycyclohexylphenyl ketone; 2-benzyl-2-di methylamino-1-(4-morpholinophenyl)-butan-1-one; 2,2-dimethoxy-2-phenylacetophe morpholinyl 3-1-propanone available from Ciba-Geigy under the grade designation Irgacure.RTM. 184, 369, 651, and 907 respectively.

Additional examples of commercially available photoinitiators from Ciba-Specialty Chemicals, include, but are not limited to, 2-hydroxy-2-methyl-4-1-phenyl-propan-1-one (HMPP)—Darocure 1173; 2,4,6-trimethyl benzoyl diphenyl phosphine oxide (TPO)—Darocure 4265; 50-50 Blend of HMPP and TPO; 2-methyl-1 [4-(methylthio)phenyl]-2-morpholino propan-1 one (MMMP)—Irgacure 907; and 2,2-dimethoxy-2-phenyl acetophenone (BDK)—Irgacure 651. Examples of c-commercially available photoinitiators from BASF, include, but are not limited to, 2,4,6-trimethyl benzoyl diphenyl phosphine oxide (Lucirin TPO); alpha hydroxyketone; and 2-hydroxy-2-methyl-phenyl-1-propane.

The emulsion also may optionally contain at least one colorant or pigment. For example, colorants or pigments as used herein include pigment, dye, mixtures of pigment and dye, mixtures of pigments, mixtures of dyes, and the like. For simplicity, the term "colorant" as used herein is meant to encompass such colorants, dyes, pigments, and mixtures, unless specified as a particular pigment or other colorant component. In embodiments, the colorant comprises a pigment, a dye, mixtures thereof, carbon black, magnetite, black, cyan, magenta, yellow, red, green, blue, brown, mixtures thereof, in an amount of about 1 percent to about 25 percent by weight based upon the total weight of the composition. It is to be understood that other useful colorants will become readily apparent based on the present disclosures.

In general, useful colorants include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Lithol Scarlet D3700 (BASF), Toluidine Red (Aldrich), Scarlet for Tiher-moplast NSD Red (Aldrich), Lithol Scarlet 4440, NBD 3700 (BASF), Bon Red C (Dominion Color), Royal Brilliant Red RD-8192 (Paul Uhlrich), Oracet Pink RF (Ciba Geigy), Paliogen Red 3340 and 3871 K (BASF), Lithol Fast Scarlet L4300 (BASF), I-Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Uhlrich), Lumogen Yellow D0790 (BASF), Suco-Gelb 1250 (BASF), Suco-Yellow D1355 (BASF), Suco Fast Yellow D1165, D1355 and D1351 (BASF), Hostaperm Pink E (Hoechst), Fanal Pink D4830 (BASF), Cinquasia Magenta (DuPont), Paliogen Black L9984 9BASF), Pigment Black K801 (BASF) and particularly carbon blacks such as REGAL 330 (Cabot), Carbon Black 5250 and 5750 (Columbian Chemicals), and the like or mixtures thereof.

Additional useful colorants include pigments in water based dispersions such as those commercially available from Sun Chemical, for example SUNSPERSE BHD 6011X (Blue 15 Type), SUNSPERSE BHD 9312X (Pigment Blue 15 74160), SUNSPERSE BHD 6000X (Pigment Blue 15:3 74160), SUNSPERSE GHD 9600X and GHD 6004X (Pigment Greer, 7 74260), SUNSPERSE QHD 6040X (Pigment Red 122 73915), SUNSPERSE RHD 9668X (Pigment Red 185 12516), SUNSPERSE RHD 9365X and 9504X (Pigment Red 57 15850:1, SUNSPERSE YHD 6005X (Pigment Yellow 83-1108), FLEXIVERSE YFD 42549 (Pigment Yellow 17 21105), SUNSPERSE Y-ID) 6020X and 6045X (Pigment Yellow 74 11741), SUNSPERSE YHD 600X and 9604X (Pigment Yellow 14 21095), FLEXIVERSE LFD 4343 and LFD 9736 (Pigment Black 7 77226) and the like or mixtures thereof. Other useful water based colorant dispersions include those commercially available from Clariant, for example, HOSTAFINE Yellow GR, HOSTAFINE Black T and Black TS, HOSTAFINE Blue B2G, HOSTAFINE Rubine F6B and magenta dry pigment.

Other useful colorants include, for example, magnetites, such as Mobay magnetites MO8029, MO8960; Columbian magnetites, MAPICO BLACKS and surface treated magnetites; Pfizer magnetites CB4799, CB5300, CB5600, MCX6369; Bayer magnetites, BAYFERROX 8600, 8610; Northern Pigments magnetites, NP-604, NP-608; Magnox magnetites TMB-100 or TMB-104; and the like or mixtures thereof. Specific additional examples of pigments include phthalocyanine HELIOGEN BLUE L6900, D6840, D7080, D7020, PYLAM Oil, BLUE, PYLAM OIL YELLOW, PIGMENT BLUE 1 available from Paul Uhlrich & Company, Inc., PIGMENT VIOLET 1, PIGMENT RED 48, LEMON CHROME YELLOW DCC 1026, E.D. TOLUIDINE RED and BON RED C available from Dominion Color Corporation, Ltd., Toronto, Ontario, NOVAPERM YELLOW FGL, HOSTAPERM PINK E from Hoechst, and CINQUASIA MAGENTA available from E.I. DuPont de Nemours & Company, and the like. Examples of magentas include, for example, 2,9-dimethyl substituted quinacridone and anthraquinone dye identified in the Color Index as CI-60710, CI Dispersed Red 15, diazo dye identified in the Color Index as CI-26050, CI Solvent Red 19, and the like or mixtures thereof. Illustrative examples of cyans include copper tetra (octadecyl sulfonamide) phthalocyanine, x-copper phthalocyanine pigment listed in the Color Index as CI74160, CI Pigment Blue, and Anthrathrene Blue identified in the Color Index as DI 69810, Special Blue X-2137, and the like or mixtures thereof. Illustrative examples of yellows that may be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,4-dimethoxy acetoacetanilide, and Permanent Yellow FGL. Colored magnetites, such as mixtures of MAPICOBLACK and cyan components may also be selected as pigments.

The colorant, such as carbon black, cyan, magenta and/or yellow colorant, is incorporated in an amount sufficient to impart the desired color. In general, pigment or dye is employed in an amount ranging from about 1 to about 35 percent by weight of the particles on a solids basis, such as from about 5 to about 25 percent by weight or from about 5 to about 15 percent by weight. However, amounts outside these ranges can also be used, in embodiments.

Other components disclosed herein may also contain a coagulant, such as a monovalent metal coagulant, a divalent metal coagulant, a polyion coagulant, or the like. A variety of coagulants are known in the art, as described above. As used herein, "polyion coagulant" refers to a coagulant that is a salt or oxide, such as a metal salt or metal oxide, formed from a metal species having a valence of at least 3, and desirably at least 4 or 5. Suitable coagulants thus include, for example, coagulants based on aluminum such as polyaluminum halides such as polyaluminum fluoride and polyaluminum chloride (PAC), polyaluminum silicates such as polyaluminum sulfosilicate (PASS), polyaluminum hydroxide, polyaluminum phosphate, aluminum sulfate, and the like. Other suitable coagulants include, but are not limited to, tetraalkyl titanates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the coagulant is a polyion coagulant, the coagulants may have any desired number of polyion atoms present. For example, suitable polyaluminum compounds in embodiments have from about 2 to about 13, such as from about 3 to about 8, aluminum ions present in the compound Other components may also optionally include a wax, which can be either a single type of wax or a mixture of two or more different waxes, A single wax can be added to formulations, for example, to improve particular properties, such as particle shape, presence and amount of wax on the particle surface, charging and/or fusing characteristics, gloss, stripping, offset properties, and the like. Alternatively, a combination of waxes can be added to provide multiple properties to the composition.

Suitable examples of waxes include waxes selected from natural vegetable waxes, natural animal waxes, mineral waxes, synthetic waxes and functionalized waxes. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes include, for example, Fischer-Tropsch wax, acrylate wax, fatty acid amide wax, silicone wax, polytetrafluoroethylene wax, polyethylene wax, and polypropylene wax, and mixtures thereof.

Examples of waxes of embodiments include polypropylenes and polyethylenes commercially available from Allied Chemical and Baker Petrolite, wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. The commercially available polyethylenes usually possess a molecular weight Mw of from about 1,000 to about 1,500, while the commercially available polypropylenes utilized have a molecular weight of about 4,000 to about 5,000. Examples of functionalized waxes include amines, amides, imides, esters, quaternary amines, carboxylic acids or acrylic polymer emulsion, for example, JONCRYL 74, 89, 130, 537, and 538, all available from Johnson Diversey, Inc., chlorinated polypropylenes and polyethylenes commercially available from Allied Chemical and Petrolite Corporation and Johnson Diversey, Inc. Many of the polyethylene and polypropylene compositions useful in embodiments are illustrated in British Pat. No. 1,442,835, the entire disclosure of which is incorporated herein by reference.

EXAMPLES

In order to optimize a process for the preparation of a curable unsaturated polyester emulsion via the phase inversion technique, a full factorial $2^3$ L-8 design with 3 repeats were carried out. The three variables explored were temperature, solvent ratio (SR) and neutralization ratio (NR). The polyester resin utilized, was poly(propoxylated bisphenol-A co-fumarate), obtained from Reichold Chemicals as XP777. The phase inversion agent was isopropanol, and the neutralizing agent was ammonium hydroxide.

General Procedure for Phase Inversion Emulsification

A 1 liter kettle, equipped with a mechanical stirrer and distillation apparatus, was charged with 192 gram of polyester resin XP777, obtained from Reichold, with an acid value of 14.08 g/KOH, 8 grams of Irgacure 814, obtained from Ciba Geigy, 100 grams of methyl ethyl ketone (MEK), and 25 grams of isopropanol.

Solvent ratio (SR) was calculated as the ratio of solvent to solid. In Experiment 1-Y1, the ratio of methyl ethyl ketone solvent (100 grams) to solids (200 grams comprised of resin and photoinitiator) is calculated to be 0.50 (100 divided by 200).

The mixture was stirred at 350 rpm for 3 hours at 45 degrees centigrade (or 318 degrees Kelvin as depicted in Example 1 of Table 1), during which the resin and photoinitiator was fully dissolved in the organic solvent.

To this mixture was then added 9 grams of a 10% aqueous ammonium hydroxide solution over a 10 minute period, as depicted by a neutralization ratio (NR) of 1.1 in Example 1 of Table 1. This neutralization ratio is defined as the amount of base required to neutralize the resin acidic groups. A neutralization ratio of 1.0 implies that every acidic moiety in the resin is neutralized by a base (hydroxide ion).

For the resin of this example, 192 grams is utilized with an acid number of 14 g/KOH. Using a ratio of 1.1, the amount of ammonium hydroxide (10% aqueous) is calculated as follows: $NH_4OH$ (grams)=(NR)×(weight of Resin)×(acid value of resin)×(0.00303), which equals: (1.1)×(192)×(14.08)×(0.00303)=9 grams of ammonium hydroxide (10% solution). Thus, this shows that 10% excess of base was added.

To the mixture, 600 grams of water was then added dropwise (pump) at a rate of 4 grams per minute, resulting with a polyester dispersion. The reactor was then heated to 85 degrees centigrade to distill off the organic solvent. The final particle size for this emulsion was 217 nm and represented as Experiment 1-Y1.

Experiment I-Y1 was repeated twice and resulted in an emulsion particle sizes of 234.5 nm (Experiment I-Y2) and 231 nm (Experiment I-Y3). Next, the neutralization ratio (NR) was changed to 1.3 and the temperature and solvent ratio were held constant. This resulted in a particle size of 210 nm (Experiment II-Y1). This experiment was then repeated twice and resulted in emulsion particle sizes of 207 nm (Experiment II-Y2) and 188 nm (Experiment II-Y3).

Next, the SR was changed to 0.625 and experiments were run with constant temperature and constant neutralization ratio. Then, temperature was changed to 328 K and SR and NR were held constant. A total of 24 experiments were carried out to complete the full factorial $2^3$ L-8 design with three repeats utilizing the same conditions (Table 1).

TABLE 1

| | | | | Particle Size (nm) | | |
| --- | --- | --- | --- | --- | --- | --- |
| Example | Temp. (° K) | SR | NR | Y1 | Y2 | Y3 |
| I | 318 | 0.5 | 1.1 | 217 | 234.5 | 231 |
| II | 318 | 0.5 | 1.3 | 210 | 207 | 188 |
| III | 318 | 0.625 | 1.1 | 178.5 | 188.5 | 175.5 |
| IV | 318 | 0.625 | 1.3 | 138 | 133.5 | 134.5 |
| V | 328 | 0.5 | 1.1 | 211.5 | 222 | 214 |
| VI | 328 | 0.5 | 1.3 | 199 | 184.5 | 175.5 |
| VII | 328 | 0.625 | 1.1 | 186 | 191 | 185 |
| VIII | 328 | 0.625 | 1.3 | 158.5 | 152.5 | 160.5 |

In Table 1, SR represents the amount of solvent used with respect to the total amount of solids (resins+initiator). For example, in Example I-Y1, there were 100 grams of MEK, 192 grams of resin and 8 grams of initiator. Thus, the 50 represents a 50% solvent ratio: [100 grams MEK]/[(100 grams MEK)+(192 grams resin)+(8 grams initiator)]=0.5.

In Table 1, the amount of neutralization ratio (NR) was calculated using an equimolar amount to the acid value of the resin. Hence, 110 percent neutralization ratio implies that 10% more ammonium hydroxide was utilized than necessary to neutralize 100% of the polyester resin based on the acid value.

In Table 1, temperature is measured in degrees Kelvin, which calculated by degrees centigrade plus the integer 273.

The results generated a model utilizing the DOE PRO XL version 3 statistical design software available from Digital Computations Inc., for both particle size control (Y) and variability (S) in the size range of 135 nm to 230 nm. A good regression coefficient was obtained for Particle Size (r2=0.935) and variability (r2=0.991). The main factor for Particle Size Control was found to be solvent ratio, followed by neutralization ratio. Temperature was not found to be a significant factor. For variability, all three factors were important. The transfer function obtained was:

$$Y=575-[(447.4)(SR)]-[(163.75)(NR)]+[(0.3285)(T)(SR)]; \text{ and}$$

$$S=789-[(2.87)(T)]+[(256.9)(SR)]-[(586.4)(NR)]+[(2.27)(T)(NR)]-[(250.8)(SR)(NR)].$$

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for preparing a curable polyester based emulsion comprising a resin having a desired particle size, the process comprising:
   selecting at least one of a desired particle size and variability of the desired particle size;
   forming a curable polyester based emulsion by phase inversion; and
   controlling a solvent ratio, neutralization ratio, and temperature of the phase inversion according to the transfer functions:

$$Y=Z_1 \cdot \{575-[(447.4)(SR)]-[(163.75)(NR)]+[(0.3285)(T)(SR)]\}; \text{ and}$$

$$S=Z_2 \cdot \{789-[(2.87)(T)]+[(256.9)(SR)]-[(586.4)(NR)]+[(2.27)(T)(NR)]-[(250.8)(SR)(NR)]\};$$

wherein Y is the desired particle size (in nanometers), S is the variability of the desired particle size (in nanometers), SR is the solvent ratio, NR is the neutralization ratio, T is the temperature (in degrees Kelvin), and $Z_1$ and $Z_2$ independently represent error factors of about 0.8 to about 1.2.

2. The process of preparing a curable polyester based emulsion of claim 1, wherein the desired particle size is about 50 to about 250 nm.

3. The process of preparing a curable polyester based emulsion of claim 1, wherein the desired particle size is about 135 to about 230 nm.

4. The process of preparing a curable polyester based emulsion of claim 1, wherein the resin has a particle size of about 180 to about 200 nm.

5. The process of preparing a curable polyester based emulsion of claim 1, wherein the resin has a particle size of about 190 nm.

6. The process of preparing a curable polyester based emulsion of claim 1, wherein the variability of the desired particle size is about 1 to 25 nm.

7. The process of preparing a curable polyester based emulsion of claim 1, wherein the variability of the desired particle size is about 1 to 15 nm.

8. The process of preparing a curable polyester based emulsion of claim 1, wherein the variability of the desired particle size is about 1 to 10 nm.

9. The process of preparing a curable polyester based emulsion of claim 1, wherein $Z_1$ and $Z_2$ independently represent error factors of about 0.9 to about 1.1.

10. The process of preparing a curable polyester based emulsion of claim 1, wherein $Z_1$ and $Z_2$ independently represent error factors of about 0.95 to about 1.05.

11. The process of preparing a curable polyester based emulsion of claim 1, wherein the phase inversion process comprises dissolving a resin and an optional additional component into a solution of an organic solvent and a phase inversion organic solvent to form a mixture; adding a neutralization agent; adding water; and removing the organic solvent.

12. The phase inversion process of claim 11, wherein the organic solvent is selected from the group consisting of an aromatic hydrocarbon solvent, an aliphatic hydrocarbon solvent, an ester solvent, an ether solvent, a ketone solvent, a halogenated aliphatic hydrocarbon solvent, a halogenated saturated hydrocarbon solvent, and mixtures thereof.

13. The phase inversion process of claim 11, wherein the organic solvent is selected from the group consisting of methyl ethyl ketone and ethyl acetate.

14. The phase inversion process of claim 11, wherein the organic solvent is methyl ethyl ketone.

15. The phase inversion process of claim 11, wherein the phase inversion organic solvent is selected from the group consisting of isopropanol, acetic acid, acetone, acetonitrile, diethylene glycol, diglyme, dimethoxy-ethane (glyme), dimethyl-sulfoxide (DMSO), dimethyl-formamide (DMF), dioxane, ethanol, ethylene glycol, glyercin, methanol, propan-1-ol, t-butyl alcohol, and mixtures thereof.

16. The phase inversion process of claim 11, wherein the phase inversion organic solvent is isopropanol.

17. The phase inversion process of claim 11, wherein the neutralization agent selected is from the group consisting of ammonium hydroxide, ammonium chloride, NaOH, KOH and LiOH.

18. The phase inversion process of claim 11, wherein the neutralization agent is ammonium hydroxide.

19. The phase inversion process of claim 11, wherein the optional additional component is a photoinitiator.

20. The phase inversion process of claim 11, wherein the mixture of said resin, optional additional component, organic solvent and phase inversion organic solvent comprises 10 parts resin and component, 5-7 parts organic solvent and 1-3 parts phase inversion solvent.

* * * * *